US007953544B2

(12) United States Patent
Amemiya et al.

(10) Patent No.: US 7,953,544 B2
(45) Date of Patent: May 31, 2011

(54) METHOD AND STRUCTURE FOR VEHICULAR TRAFFIC PREDICTION WITH LINK INTERACTIONS

(75) Inventors: Yasuo Amemiya, Hartsdale, NY (US); Wanli Min, Mount Kisco, NY (US); Laura Wynter, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1163 days.

(21) Appl. No.: 11/626,592

(22) Filed: Jan. 24, 2007

(65) Prior Publication Data

US 2008/0175161 A1 Jul. 24, 2008

(51) Int. Cl.
*G06F 19/00* (2006.01)
*G06G 7/70* (2006.01)
*G06G 7/76* (2006.01)
*G08G 1/00* (2006.01)

(52) U.S. Cl. ........ 701/117; 701/118; 701/119; 342/454; 340/995.13

(58) Field of Classification Search .................. 701/117, 701/118, 119; 702/179; 342/454; 340/995.13
See application file for complete search history.

(56) References Cited

U.S. PATENT DOCUMENTS

| | | | | |
|---|---|---|---|---|
| 5,889,477 | A * | 3/1999 | Fastenrath | 340/905 |
| 6,317,686 | B1 | 11/2001 | Ran | |
| 6,470,262 | B2 | 10/2002 | Kerner et al. | |
| 6,587,779 | B1 | 7/2003 | Kerner et al. | |
| 6,721,650 | B2 | 4/2004 | Fushiki et al. | |
| 7,274,306 | B2 * | 9/2007 | Publicover | 340/907 |
| 7,363,144 | B2 * | 4/2008 | Liu et al. | 701/117 |
| 7,427,930 | B2 * | 9/2008 | Arnold et al. | 340/933 |
| 7,433,889 | B1 * | 10/2008 | Barton | 1/1 |
| 7,610,151 | B2 * | 10/2009 | Letchner et al. | 701/209 |
| 7,668,946 | B1 * | 2/2010 | Garcia-Franco et al. | 709/223 |
| 7,680,596 | B2 * | 3/2010 | Uyeki et al. | 701/210 |
| 2001/0029425 | A1 * | 10/2001 | Myr | 701/200 |
| 2004/0038671 | A1 * | 2/2004 | Trayford et al. | 455/414.3 |
| 2004/0073361 | A1 * | 4/2004 | Tzamaloukas et al. | 701/210 |
| 2004/0143385 | A1 * | 7/2004 | Smyth et al. | 701/117 |
| 2005/0125195 | A1 * | 6/2005 | Brendel | 702/182 |
| 2006/0122846 | A1 * | 6/2006 | Burr et al. | 705/1 |
| 2006/0206256 | A1 * | 9/2006 | Kumagai et al. | 701/117 |
| 2007/0208492 | A1 * | 9/2007 | Downs et al. | 701/117 |
| 2007/0208496 | A1 * | 9/2007 | Downs et al. | 701/117 |
| 2007/0208498 | A1 * | 9/2007 | Barker et al. | 701/117 |

OTHER PUBLICATIONS

"DYNASMART-P", by H. Mahmassani [http://mctrans.ce.ufl.edu/featured/dynasmart/index.htm].

* cited by examiner

*Primary Examiner* — Khoi Tran
*Assistant Examiner* — Jaime Figueroa
(74) *Attorney, Agent, or Firm* — McGinn IP Law Group, PLLC

(57) ABSTRACT

A method and structure for predicting traffic on a network, includes a receiver which receives data related to traffic on at least a portion of a network. A calculator calculates a traffic prediction for at least a part of the network, the traffic prediction being calculated by using a deviation from a historical traffic on the network.

20 Claims, 5 Drawing Sheets

300

A: [B, C, D, E, F]

Relationship Vector for Link A

301

A: [+1, +3, 0, -1, 0]

Difference Vector for Link A

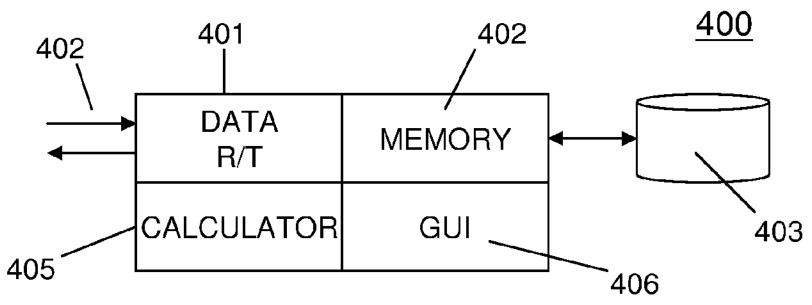
FIGURE 4
FIGURE 5
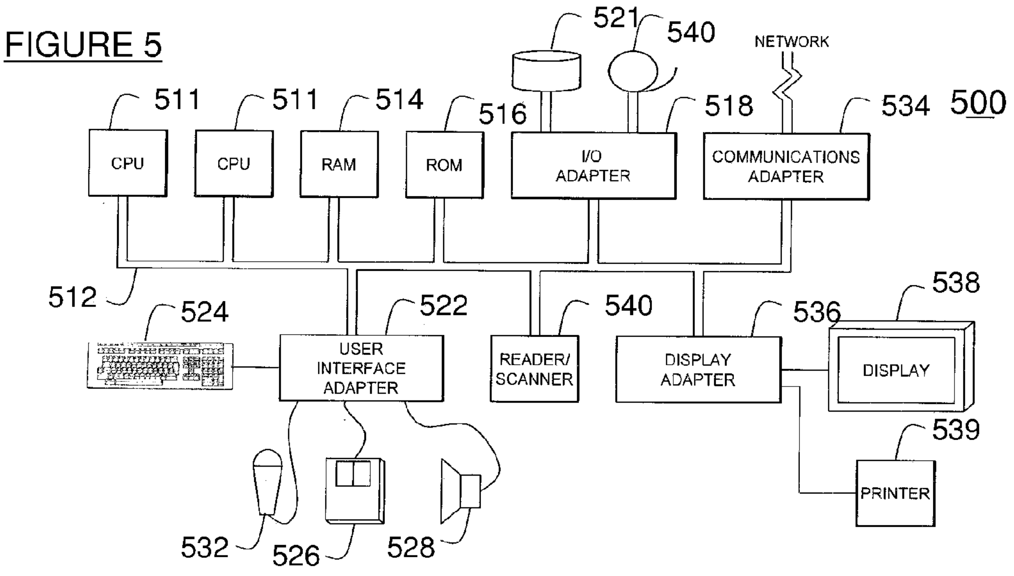
FIGURE 6
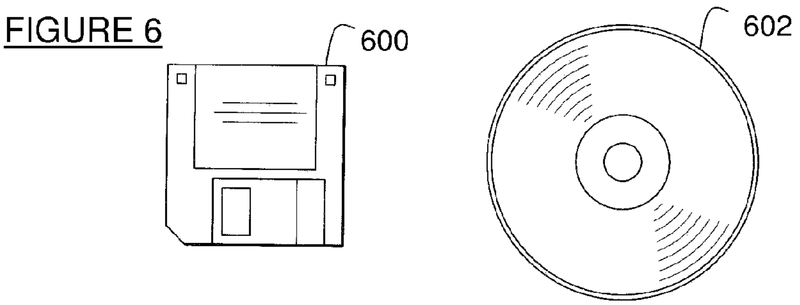

METHOD AND STRUCTURE FOR VEHICULAR TRAFFIC PREDICTION WITH LINK INTERACTIONS

BACKGROUND OF THE INVENTION

1. Field of the Invention

The present invention generally relates to predicting traffic state on a transportation network. More specifically, for each link in the network, deviations from the historical traffic are stored in a matrix format and used for successive time period predictions.

2. Description of the Related Art

In the transportation sector, travel time information is necessary to provide route guidance and best path information to travelers and to fleet operators. This information is usually based on average travel time values for every road segment (link) in the transportation network. Using the average travel times, best path computations can be made, using any of a variety of shortest path algorithms. A route is thus a sequence of one or more links in the transportation network. In order to determine route guidance and best path information for future time periods, several conventional methods are available.

The standard way in which such information is provided is to make use of average values, as described above. The use of those average values provides an average-case best route or path to a user. However, due to congestion on roadways, average-case travel times on the link may vary considerably from the travel times at specific time periods. For example, the peak travel time along a link may be twice the travel time at off-peak periods. In such cases, it is desirable to make use of time-dependent values for the travel times on links in providing route guidance and/or best path information to users.

In a first conventional method related to reporting vehicle data, a method is proposed in which objects such as queues are identified in a traffic stream and those objects are tracked, allowing for an estimated value of the traffic parameter, which may include travel time. In particular, data "relating to the mean number of vehicles in the respective queue, the queue length, the mean waiting time in the queue and the mean number of vehicles on the respective direction lane set of a roadway section, and relating to current turn-off rates, can be used on a continuous basis for producing historical progress lines", where historical progress lines imply the prediction of the current value to a present or near future time period. This method becomes quite complex if link interactions are taken into account and real-time computation of such values would not be possible.

Future road traffic state prediction is, however, the topic of a second conventional method. A method for predicting speed information is provided for multiple time intervals into the future (e.g., on the order of 0-60 minutes to several hours or 1-3 days into the future). The method described takes a historical speed for a similar link at the same time instant for the same type of day and multiplies it by a weighting factor less than or equal to one, determined through regression on such parameters as predicted weather conditions, construction, and any known scheduled events on the segment.

This method hence relies upon high-quality predicted weather data, as well as information on scheduled events along the link in question. However, such data is not often available in a form amenable to incorporation into traffic predictions.

However, to the present inventors, these methods described above suggest that a better solution is required in several instances.

(i) In the case where weather predictions and scheduled event data are not available, good predictions of future travel time are still often required.

(ii) It is not always sufficient to compute a single weighting factor to scale the average travel time (e.g., as proposed in the second conventional method), since the effects of the weather or an event can vary widely across different links. Additionally, the highly detailed data on present conditions, as is assumed in the first conventional method, is generally unavailable on most road segments, and is less valid for predictions beyond the very short-term.

Hence, a need exists for a better method of providing vehicular traffic prediction. Prior to the present invention, there has been no method that balances the need for more accurate predictions in the near-term with computational efficiency, so that the method is applicable to large traffic networks in real time.

SUMMARY OF THE INVENTION

In view of the foregoing, and other, exemplary problems, drawbacks, and disadvantages of the conventional systems, it is an exemplary feature of the present invention to provide a structure (and method) in which vehicular traffic prediction can be calculated both accurately and faster than using conventional methods.

It is another exemplary feature of the present invention to provide a structure and method for vehicular traffic prediction that can be used in large networks, in real-time and in highly variable environments.

It is another exemplary feature of the present invention to describe a method of traffic prediction having several prediction schemes coupled together, such that effects of one or more schemes predominate at very short-term predictions and effects of one or more schemes predominate for medium-term predictions.

It is another exemplary feature of the present invention to provide a method that uses time-dependent traffic state data well into the future, as opposed to average values, thereby providing the ability to reflect high variability in traffic.

It is another exemplary feature of the present invention to describe a method of traffic prediction having the ability to adapt to recent traffic state information to generate more accurate predictions.

It is yet another exemplary feature of the present invention to provide a method and structure for traffic prediction having the ability to provide highly accurate near-term predictions using correlation techniques across a number of links, where the number may be determined by the correlation level automatically, or manually, as a function of the link type.

To achieve the above, and other, exemplary aspects, as a first exemplary aspect of the present invention, described herein is an apparatus including a receiver to receive data related to traffic on at least a portion of a network and a calculator to calculate a traffic prediction for at least a part of the network, wherein the traffic prediction is calculated by using a deviation from a historical traffic on the network.

As a second exemplary aspect of the present invention, also described herein is a method to calculate a traffic prediction for a traffic network, using a deviation from a historical traffic on the network.

As a third exemplary aspect of the present invention, also described herein is a signal-bearing medium tangibly embodying a program of machine-readable instructions executable by a digital processing apparatus to perform a method of predicting traffic on a network, using a deviation from a historical traffic on the network.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 4 shows a block diagram 400 of an application program that could implement the method of the present invention;

FIG. 5 illustrates an exemplary hardware/information handling system 500 for incorporating the present invention therein; and FIG. 6 illustrates a signal bearing medium 600, 602 (e.g., storage medium) for storing steps of a program of a method according to the present invention.

DETAILED DESCRIPTION OF AN EXEMPLARY EMBODIMENT OF THE INVENTION

Figure 1A:
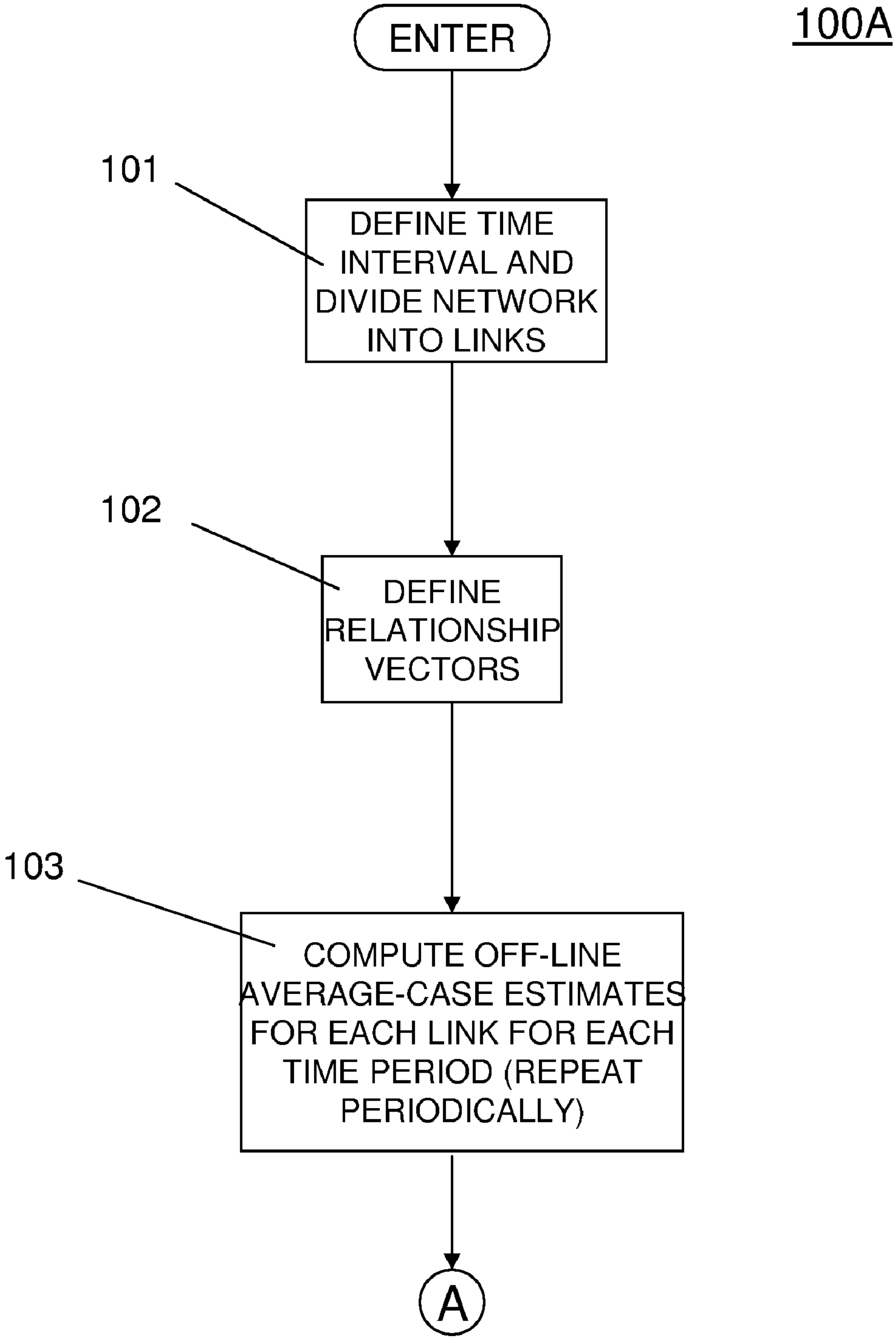
FIGS. 1A-1C show a flowchart 100A, 100B, 100C of an exemplary embodiment of the method of the present invention.

Referring now to the drawings, and more particularly to FIGS. 1A-6, an exemplary embodiment will now be described.

The invention provides an exemplary technique for determining the traffic state characteristics (e.g., speed, density, flow, etc.) that best characterize the progression of that state into the future. That is, the invention allows prediction into the short or medium future through the use of multiple prediction schemes coupled together, some of which are predominant at short-term intervals and others for medium-term predictions.

An advantage of using this method over other solutions is (i) an ability to make use of time-dependent traffic state data well into the future, as opposed to average values, which traffic state data may include high variability, (ii) an ability to adapt to the recent traffic state information to generate more accurate predictions, and (iii) an ability to provide highly accurate near-term predictions using correlation techniques across a number of links, where the number may be determined by the correlation level automatically, or manually, as a function of the link type, etc.

As background for explaining the details of the method of the present invention, it is noted that there are numerous methods that exist for predicting traffic state on a transportation network. Considerable literature exists on such methods, which include traffic assignment, dynamic traffic assignment, network equilibrium, simulation, partial differential equation-based models, etc., as are described, for example, in Y. Sheffi, "Urban transportation networks: Equilibrium analysis with mathematical programming methods", Prentice-Hall, Englewood Cliffs, N.J., 1985. The website article "Dynasmart", by H. Mahmassani, also describes traffic prediction methods. [http://mctrans.ce.ufl.edu/].

However, most conventional methods are computationally intensive and cannot, therefore, provide results for large areas. They are rather limited to small- to moderate-sized geographic areas and are not practical to provide state-dependent internet mapping, route guidance, or fleet management for large areas such as on the order of multiple regions, states, or countries.

On the other hand, it is necessary to have some prediction of traffic conditions into the future so as to estimate travel times and best paths for future times.

A third conventional method is concerned with detecting "phase transitions between free-flowing and slow-moving traffic and/or stationary traffic states", which is a method quite different from that of the present invention.

The second conventional method, previously mentioned, describes a traffic information system for predicting travel times that utilizes Internet based collecting and disseminating of information. This method is also different from that of the present invention in that it uses a set of look-up tables with discount factors based on predicted weather or special planned events. That is, each class of weather is associated with a speed discount factor, or travel time increase factor, and, depending on the predicted weather on a link, that discount factor is applied.

A fourth conventional method uses probe vehicles to predict traffic conditions.

Finally, commonly-assigned patent application YOR20041175 is a precursor to the present invention. The present inventors have recognized that this precursor method, while enabling very fast computation of traffic predictions, suffers from some drawbacks discussed above, which are related to the assumption that each link on the traffic network can be predicted independently and to the exclusive use of templates.

This commonly-assigned patent application provides a solution which requires more data than that of the second conventional method, for example, and uses a template technique for identifying the historical progression of travel times on each link that best matches its characteristics. The use of the term "template" refers to a pattern which is constructed to represent the shape of the traffic characteristic over a reference period, such as a day, or an hour, and each such reference period may have its own template, or pattern. In contrast to assumptions in the first conventional method, this template technique is applicable on road segments where very little data is available and, hence, can be applied to rural and suburban regions. Traffic speed is an important characteristic of traffic state predicted by the method of this commonly-assigned invention. Traffic density or other similar traffic state variables may also be predicted by the same technique.

The present inventors have recognized that this commonly-assigned patent application suffers from several drawbacks, which reduce its accuracy in some road traffic environments. The first two drawbacks are related to the assumption that each link of the network is independent, and the third drawback is related to its use of templates, as follows.

(i) First, since the method assumes that the traffic characteristic on each link of the network is independent, it inherently assumes that there is no temporal correlation across the network. In other words, the traffic speed, for example, between two ramps on a highway is independent between the next two ramps upstream, or the previous two ramps downstream. Clearly, at successive time intervals, this is not the case, since the traffic between the previous two ramps will, at a subsequent time period, reach the following link. While that assumption allows for very fast computation times, it also accounts for reduced accuracy.

(ii) Second, the commonly-assigned application does not take into account any spatial correlations across the network. In other words, traffic on roadways meeting at a junction are not considered together. For example, an accident on a roadway would clearly have an impact on the prediction at another roadway that intersects the first. Clearly, then, for accurate modeling of traffic characteristics in the near term (real-time or short-term predictions), it is preferable to take into account some cross-link correlations. At the same time, very detailed correlation structures would cause the computation time to increase to the point that medium and large-sized networks could not be handled in real-time. Again, this assumption allows for very fast computation times, but it also accounts for reduced accuracy.

(iii) In a highly variable environment, even on a single link, the template method suffers a notable degradation of accuracy, as templates are no longer a good base predictor of the traffic during any period. Template-based methods, such as that used in the commonly-assigned application, work better in the presence of regular, repeating traffic patterns with minor deviations.

In contrast to the methods mentioned above, the present invention allows traffic prediction into the short or medium-term future. The invention makes the assumption that historical traffic data on the links of the transportation network is available and provided continuously. Traffic data may be traffic volumes, speeds, densities, or other measures of road traffic at a point in time and space.

Methods, systems, and devices for obtaining such traffic data is well known in the art. The present invention acquires this data, but more specifically relates to the utilization of this data and, therefore, can be implemented into any existing system having existing data acquisition means.

It is supposed in the following discussion that the majority of the links' data is being provided at each time point. In other words, the present invention functions better in situations in which there is no significant amount of missing data, that is, a situation in which traffic data arrives continuously and can be stored. The method of the algorithm can be re-run periodically on this stored data, to recalibrate values that, in turn, are used with the data that is produced continuously, or in "real-time".

Detailed Description of an Exemplary Prediction Algorithm

Figure 1B:
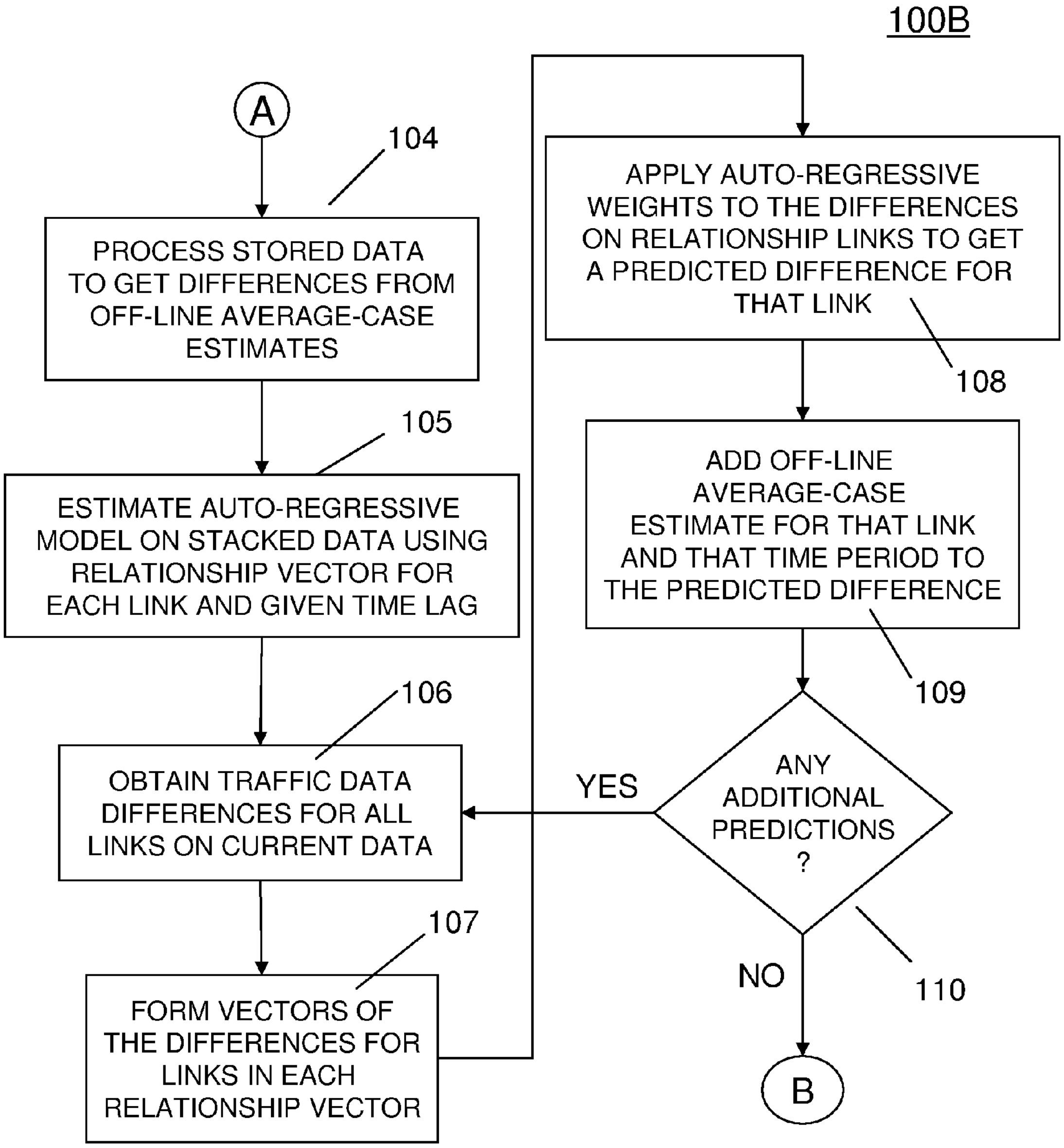
Figure 1C:
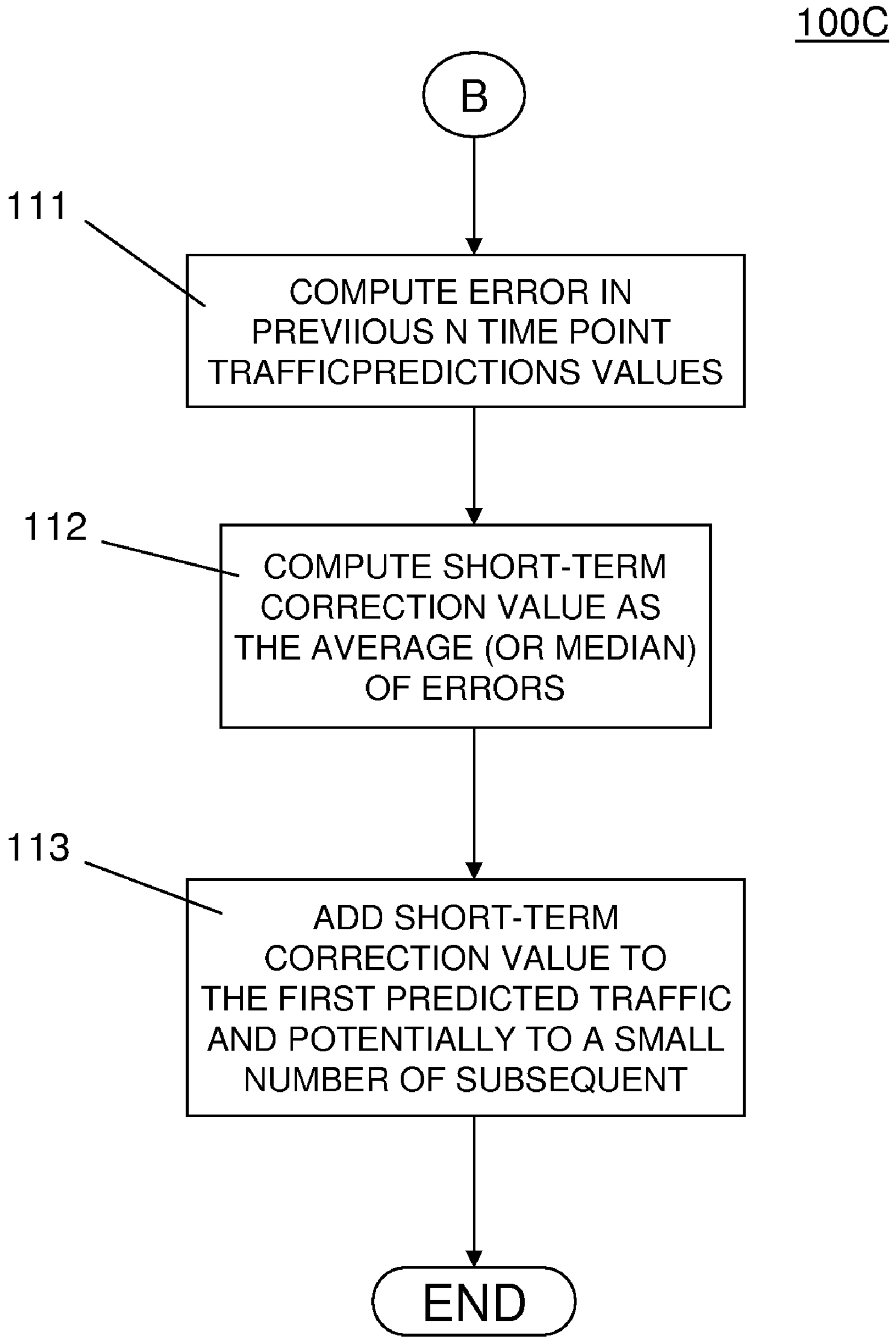

FIG. 1A through FIG. 1C show a flowchart 100A-100C of the method described below for the exemplary embodiment, including a number of steps to be performed before any predictions are made (FIG. 1A).

The algorithm recognizes that near-term predictions rely on information from upstream links at prior time intervals in order to be accurate. However, the more data is included in the computation of the predicted value, for a given link, the longer the computation time. Hence, this algorithm provides a balance between the two needs, for computational efficiency.

The means for handling correlations across links depends on the type of road for the link in question. A highway, for example, will require a larger number of links to be cross-correlated upstream than a surface street. This is the case because the vast majority of traffic on a highway continues on the highway for multiple links, whereas on surface streets, the percentage is considerably smaller.

Firstly, as shown in step 101, one must perform a division of time and space into, preferably, relatively homogeneous subsets. An example of dividing time into relatively homogeneous intervals is to consider each day of the week and each hour of the 24-hour day separately, as in Monday 12 pm, Monday 1 pm, . . . Friday 9 pm, . . . Sunday 3 am, etc. A different, and less detailed division of time into intervals may be to consider each day of the week and two time subsets per day, peak and off-peak, as in Monday peak, Monday off-peak, Tuesday peak, Tuesday off-peak, etc. Other appropriate time divisions are, of course, possible.

As regards spatial decomposition, the network in the exemplary embodiment is also divided into links included in the network In step 102 a relationship vector for every network link to be predicted is defined. The relationship vector for each link contains the other links of the network whose traffic has an impact on that link.

One way of computing the relationship vector for a link is to evaluate which upstream links have traffic that would be present on or pass through the link in question during the prediction interval. For instance, if the prediction interval is 5 minutes, and the time division is an off-peak time point (e.g., "off-peak" or "3 am", etc), then, based on the average speed on that link during that type of time interval, one can determine the number of miles/kilometers that could be traversed in the prediction interval (5 nm in this example).

Hence, the number of upstream relationship links that could be included form a "tree" in that they branch out behind the link, and go back a number of miles/kilometers from the link in question. Similar arguments can be used to determine the downstream links to be included in the relationship vector for that link. In addition to upstream and downstream links, one can include additional links that share either the head or the tail node of the link in question. The link itself should be included in the relationship vector.

This one-time procedure is repeated for all links, and it need only be repeated when the network changes. It is noted that the number of links to include in the relationship vector depends upon the time window of any specific prediction, since, the longer the time period, the more traffic from distant upstream links will impact the given link.

The choice as to how detailed to make the time division and the relationship vector could depend on a study of the historical data patterns and balancing the heterogeneity of the data with the computational requirements of running the method for each selected time subset and geographical subset.

Once these steps are performed, the next step 103 of the method exemplarily described herein is to compute off-line average-case estimates of the traffic for each link and for each time period. There are different ways to produce these estimates, such as taking mean values for that link, with that time period going back several time periods in the past to obtain the mean value. Any reasonable method can be used to create these values. Naturally, the better the fit of the off-line average case estimates are to the actual data, the higher the accuracy of the traffic prediction. These values can be, and preferably are, re-run periodically to capture long-term trends in the traffic.

Using the off-line average-case estimates of the traffic for each link, the historical traffic is then processed to contain only deviations from the off-line average-case estimates. In other words, in step 104 a difference is taken between those and the historical traffic. Thus, in the present invention, historical traffic is used for calibration, and predictions are made on current or real-time traffic as it arrives, predicting up to, for example, one or two hours into the future. The processed differences are stored in matrix form by concatenating the differences for successive time periods of the same type for all links in the relationship vector for that link.

Then, in a loop over all the links, in step 105, an auto-regressive model is estimated on that matrix, using a time lag to be specified, and which depends on the prediction time interval. An auto-regressive model is characterized by the time lag that it uses. In this method, a time lag of 3-5 data intervals into the past is reasonable in most instances. A data interval is the frequency at which data is recorded on each link, such as every minute, every 5 minutes, or every 10 minutes, etc.

The weights obtained from the auto-regressive model are then used in a continuous mode as new traffic data is provided. Traffic data that is provided continuously is processed by subtracting the off-line average-case estimates for each link for each time period from those traffic values, i.e. obtaining "traffic differences" for each link, in step 106.

Then, vectors are formed for each link which contain these traffic differences for all of the links in the relationship vector for that link.

Next, in step 108, the auto-regressive weights which were computed off-line in step 105 for that link and the same type of time instant that was just provided (e.g., Monday 12 pm, Tuesday peak, . . . ) are applied to that vector of traffic differences. This provides an ideal traffic difference for that link at that instant in time.

Once this is computed, in step 109, the off-line average-case estimate for that type of time period provided (e.g. Monday 12 pm, Tuesday peak, . . . ) is added back to the traffic difference to provide an estimate of the traffic for that link at the next time instant.

In order to compute traffic predictions for subsequent time instants, in step 110, the predicted value just obtained is stored as if it were an actual observation, for this and for all links. Then the process is re-applied for the next time instant in the future.

For example, if the prediction interval is 5 minutes, then the first set of predictions will be for all links 5 minutes from the current time. The process is re-applied using those estimates (as if they were actual observations) to obtain the traffic prediction two prediction intervals away (e.g., 10 minutes in the above example). The process can be repeated, usually on the order of 10-20 times at most. The quality of predictions thus made are most accurate for the short to medium term. For longer-term intervals, the off-line average-case estimates may be used.

The weights as well as the off-line average-case estimates are updated periodically, such as weekly.

As shown in steps 111-113 in FIG. 1C, to improve further the accuracy of the very short-term predictions, an additional process 100C may also be performed. This process makes use of the predictions described above and is most accurate for very short-term predictions, such as 5 to 10 minutes. Using the prediction already computed (e.g., for 5 minutes from the current time), the error between the predictions and the observed traffic is noted for the past several time points on a given link, by subtracting the observed traffic from the predicted traffic, in steps 111 and 112. The number of such time points may be 3-5, in a typical implementation.

Then a measure of the average error is computed, such as the mean of those error values, or the median, or the trimmed mean (i.e. the mean excluding the highest error).

This average error is then added to the current prediction, in step 113. It may be added to the next prediction(s) directly, or simply through the current prediction (which is, itself, used in subsequent predictions). This process may be of particular use in the presence of anomalies, such as incidents on links.

Some advantages of using this method over other solutions include at least the following:

(i) the ability to make use of time-dependent traffic state data, as opposed to only average values, which may be inaccurate at each distinct point in time;

(ii) the ability to adapt to the recent traffic state information to generate more accurate predictions; and/or (iii) the ability to provide highly accurate near-term predictions using correlation techniques across a number of links, where the number may be determined by the correlation level automatically, or manually, as a function of the link type.

The prior art known to the inventors does not include comparable techniques for transportation traffic prediction. That is, other prior art in the public literature involves accurate but computationally-intensive methods which are not applicable to large-scale transportation networks or real-time operation.

In contrast, the method of the present invention is very fast and can be applied to very large geographic regions in real-time.

Figures 2, 3:
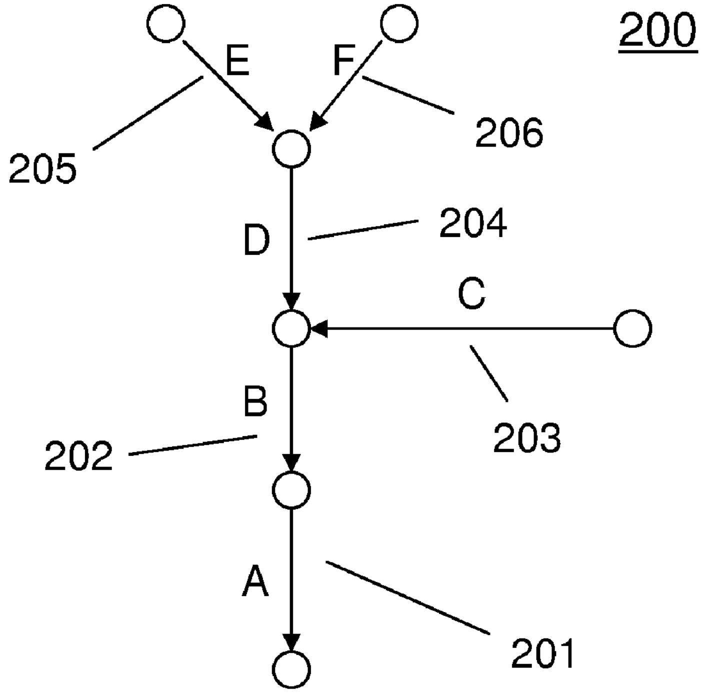
FIG. 2 shows exemplarily a small traffic network 200 used to illustrate the concepts of the present invention.
FIG. 3 shows exemplary formats 300, 301 of data of this small traffic network is stored in the templates of the present invention.

The method exemplarily described above is illustrated in a more concrete manner in FIGS. 2-4. FIG. 2 shows an exemplary simple network 200, with link A 201 as the link for which a prediction is to be calculated for demonstration of the technique. As can be seen, links are merely segments of roads interconnected by nodes, and a node may or may not have more than two links associated therewith. Depending upon the network scale and the desired granularity, a link might be a mile or less in length or many miles in length.

The network 200 is assumed to have traffic flow moving in the direction indicated as flowing toward link A 201. Of course, if link A 201 were a two-way road, a corresponding set of links would apply for traffic going into link A 201 from the opposite direction. In FIG. 2, links B, C, D, E, F 202-206 provide traffic into link A 201, as shown by the relationship vector 300 for link A shown in FIG. 3. The corresponding difference vector 301 for link A 201 is also shown in FIG. 3.

Since the difference vector 301 contains the latest deviation from historical data for all the links 202-206 that are related to link A within the time interval of the prediction, the deviation from the historical traffic in link A 201 will be the sum of the deviations in its associated links 202-206, so that the prediction for traffic in link A 201 can be simply predicted by adding the deviations in these links. The actual predicted traffic in link A would be the historical average of link A, as adjusted by the sum of the deviations in the links identified in its relationship vector 300. As demonstrated by step 110 of FIG. 1, subsequent time periods can then be predicted for link A 201 by reapplying the summed deviations of the relationship vector 300 links for each successive time period prediction.

FIG. 4 illustrates a block diagram 400 of a software application program that might be used to implement the present invention. Data receiver/transmitter module 401 receives traffic network data via input 402, as well as possibly receiving inputs from a user located remotely from the machine having the tool and transmitting information back to this remote user. Memory module 403 interfaces with memory 404, and calculator 405 executes all of the processing described above, as preferably broken down into recursive subroutines for the various specific calculations. Graphical user interface (GUI) module 406 allows a user to set up and use the tool, including scenarios of remote users in which the user is remotely located from the machine upon which the tool is actually installed.

Exemplary Hardware Implementation

FIG. 5 illustrates a typical hardware configuration of an information handling/computer system 500 in accordance with the invention and which preferably has at least one processor or central processing unit (CPU) 511.

The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., a display adapter 536 for connecting the bus 512 to a display device 538 and/or printer 539 (e.g., a digital printer or the like), or a reader scanner 540.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 511 and hardware above, to perform the method of the invention.

This signal-bearing media may include, for example, a RAM contained within the CPU 511, as represented by the fast-access storage for example. Alternatively, the instructions may be contained in another signal-bearing media, such as a magnetic data storage diskette 600 (FIG. 6) or optical storage diskette 602, directly or indirectly accessible by the CPU 511.

Whether contained in the diskette 600, the computer/CPU 511, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

From the above description, it can be seen that benefits from the method of the present invention include more accurate prediction and faster computation times than that which can be obtained using other methods While the invention has been described in terms of a single exemplary embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. An apparatus, comprising:
- a receiver to receive data related to traffic on at least a portion of a network; and
- a calculator to calculate a traffic prediction for at least a part of said network,
- wherein said traffic prediction is calculated by using a deviation from a historical traffic on said network, said deviation being a difference between a historical traffic datum value and a calculated average-case value, and
- wherein relationship vectors using such deviations are used to define interrelationships within said network.

2. The apparatus of claim 1, wherein said network comprises a plurality of interconnected links and a traffic prediction for a link in said network comprises a calculation of a deviation of a historical traffic for said link.

3. The apparatus of claim 2, wherein said traffic prediction for said link is calculated using a relationship vector that defines other links in said network that affect a traffic amount in said link within a specific time duration.

4. The apparatus of claim 2, wherein said calculator further calculates said historical traffic for said link as a calibration for traffic in said link.

5. The apparatus of claim 4, wherein said historical traffic is periodically re-calculated by said calculator.

6. The apparatus of claim 3, wherein said calculator calculates, for each link in said relationship vector, a traffic deviation from a historical traffic for each said link, and said traffic deviation for said link is expressed as a difference vector for said link, said difference vector comprising a vector of deviations of traffic of each link in said relationship vector.

7. The apparatus of claim 6, wherein said difference vector is adjusted by an auto-regressive model that modifies said deviations in said difference vector based upon data of previous time intervals for each link in said relationship vector.

8. The apparatus of claim 2, wherein said prediction comprises a prediction for a first time interval and predictions for subsequent time intervals comprise sequential re-iterations of said prediction for said first interval.

9. The apparatus of claim 1, wherein said data related to said traffic prediction comprises one or more of:
- traffic speed;
- traffic density; and
- traffic flow.

10. A method of predicting traffic on a network, said method comprising:
- receiving data related to at least a portion of said network; and
- calculating, using a processor on a computer, a traffic prediction for at least a part of said traffic network by using deviation from a historical traffic on said network, said deviation being a difference between a historical traffic datum value and a calculated average case value, and
- wherein relationship vectors using such deviations are used to define interrelationships within said network.

11. The method of claim 10, wherein said network comprises a plurality of interconnected links and a traffic prediction for a link in said network comprises a calculation of a deviation of a historical traffic for said link.

12. The method of claim 11, wherein said traffic prediction for said link is calculated using a relationship vector that defines other links in said network that affect a traffic amount in said link within a specific time duration.

13. The method of claim 11, further comprising calculating said historical traffic for said link as a calibration for traffic in said link.

14. The method of claim 13, further comprising periodically calculating said historical traffic.

15. The method of claim 12, further comprising, for each link in said relationship vector, calculating a traffic deviation from a historical traffic for each said link, said traffic deviation for said link being expressed as a difference vector for said link, said difference vector comprising a vector of deviations of traffic of each link in said relationship vector.

16. The method of claim 15, further comprising adjusting said difference vector using an auto-regressive model that modifies said deviations in said difference vector based upon data of previous time intervals for each link in said relationship vector.

17. The method of claim 11, wherein said prediction comprises a prediction for a first time interval, said method further comprising re-iterating said prediction of said prediction for said first interval as a prediction for each of a subsequent time intervals for which a future prediction is to be made.

18. The method of claim 10, wherein said data related to said traffic prediction comprises one or more of:

traffic speed;

traffic density; and traffic flow.

19. A signal-bearing storage medium tangibly embodying a program of machine-readable instructions executable by a digital processing apparatus to perform a method of predicting traffic on a network, said program comprising:

a receiver module to receive data related to traffic on at least a portion of a network; and a calculator module to calculate a traffic prediction for at least a part of said network, wherein said traffic prediction is calculated by using a deviation from a historical traffic on said network, said deviation being a difference between a historical traffic datum value and a calculated average-case value, and wherein relationship vectors using such deviations are used to define interrelationships within said network.

20. The signal-bearing medium of claim 19, wherein said network comprises a plurality of interconnected links and a traffic prediction for a link in said network comprises a calculation of a deviation of a historical traffic for said link.

* * * * *